(12) United States Patent
Matsumoto et al.

(10) Patent No.: US 10,714,781 B2
(45) Date of Patent: Jul. 14, 2020

(54) MOVING BODY

(71) Applicant: Toyota Jidosha Kabushiki Kaisha, Toyota-shi, Aichi-ken (JP)

(72) Inventors: Hiroyoshi Matsumoto, Toyota (JP); Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 20 days.

(21) Appl. No.: 16/247,047

(22) Filed: Jan. 14, 2019

(65) Prior Publication Data

US 2019/0221876 A1  Jul. 18, 2019

(30) Foreign Application Priority Data

Jan. 16, 2018 (JP) .................. 2018-005168

(51) Int. Cl.
| | |
|---|---|
| *H01M 8/2475* | (2016.01) |
| *H01M 8/04089* | (2016.01) |
| *H01M 8/04082* | (2016.01) |
| *H01M 8/04014* | (2016.01) |
| *H01M 8/04007* | (2016.01) |
| *B60L 50/72* | (2019.01) |
| *H01M 8/04111* | (2016.01) |
| *H01M 8/04701* | (2016.01) |
| *B60L 58/33* | (2019.01) |

(52) U.S. Cl.
CPC .......... *H01M 8/2475* (2013.01); *B60L 50/72* (2019.02); *H01M 8/04014* (2013.01); *H01M 8/04067* (2013.01); *H01M 8/04074* (2013.01); *H01M 8/04089* (2013.01); *H01M 8/04111* (2013.01); *H01M 8/04201* (2013.01); *H01M 8/04708* (2013.01); *B60L 58/33* (2019.02); *H01M 2250/20* (2013.01)

(58) Field of Classification Search
None
See application file for complete search history.

(56) References Cited

U.S. PATENT DOCUMENTS

| | | | |
|---|---|---|---|
| 2012/0028135 A1* | 2/2012 | Ohashi ................... | B60L 50/72 429/400 |
| 2017/0101031 A1 | 4/2017 | Ohashi | |
| 2019/0115604 A1 | 4/2019 | Takeyama | |

FOREIGN PATENT DOCUMENTS

JP          201774819 A     4/2017

* cited by examiner

*Primary Examiner* — Helen Oi K Conley
(74) *Attorney, Agent, or Firm* — Dinsmore & Shohl LLP

(57) ABSTRACT

A moving body configured to reduce a damage on a mounting state of an intercooler even when traveling or similar situation is provided. The moving body includes an intercooler bracket that has a pair of arms extending from a stack frame. At distal end sides of the respective arms, an intercooler is mounted to the respective arms. At base end sides of the respective arms, the intercooler bracket is secured to the stack frame. A connecting portion that connects the pair of arms is integrally formed with the pair of arms.

4 Claims, 5 Drawing Sheets

MOVING BODY

CROSS REFERENCE TO RELATED APPLICATIONS

The present application claims priority from Japanese patent application JP 2018-105168 filed on Jan. 16, 2018, the content of which is hereby incorporated by reference into this application.

BACKGROUND

Technical Field

The present disclosure relates to a moving body such as a vehicle, especially, relates to a moving body that includes a fuel cell.

Background Art

Conventionally, as this type of moving body, there has been a fuel cell vehicle disclosed in JP 2017-74819 A. This fuel cell vehicle includes a fuel cell assembly, and the fuel cell assembly includes an assembly frame and a fuel cell device group, which includes the fuel cell, and auxiliary machines and is integrally mounted to the assembly frame. The auxiliary machine includes an air compressor.

Incidentally, the fuel cell vehicle having the above-described structure does not include any intercooler for cooling high temperature air compressed by the air compressor. If the intercooler were mounted to the frame, the intercooler would be mounted to a lower portion of the frame with other auxiliary machines via a bracket. However, depending on mounting method of the bracket, the mounting state of the intercooler is possibly damaged due to vibration of the moving body during traveling, along with its own weight of the intercooler.

The present disclosure has been made in view of such a problem, and it is an object of the present disclosure to provide a moving body configured to stably hold a mounting state of an intercooler regardless of vibration acting on the intercooler when traveling or similar situation.

SUMMARY

In view of the above-described problem, a moving body according to the present disclosure includes a compressor, an intercooler, and a fuel cell stack. The compressor compresses and discharges an oxidant gas supplied to the fuel cell stack. The intercooler cools the oxidant gas discharged from the compressor. The fuel cell stack is supplied with the oxidant gas cooled in the intercooler. The moving body includes a stack frame, a compressor bracket, and an intercooler bracket. The fuel cell stack is mounted to the stack frame. The compressor bracket is secured to the stack frame. The compressor is mounted to the compressor bracket. The intercooler bracket is secured to the stack frame. The intercooler is mounted to the intercooler bracket. The intercooler bracket includes a pair of arms extending from the stack frame. The arms each have a distal end side where the intercooler is mounted to each of the arms. The arms each have a base end side where the intercooler bracket is secured to the stack frame. A connecting portion that connects the pair of arms is integrally formed with the pair of arms.

According to the present disclosure, the pair of arms are configured to secure the intercooler bracket to the stack frame on the base end sides of the respective arms in a state of being connected by the connecting portion integrally formed with the arms. In view of this, each of the arms does not turn even when a moment acts on the distal ends of the arms cantilevering the intercooler in the vibration of the moving body. Furthermore, the intercooler bracket with the respective arms integrated via the connecting portion also has a high rigidity in an up-down direction. Consequently, the mounting state of the intercooler can be stably held regardless of the vibration acting on the intercooler when traveling or similar situation.

Here, while the above-described configuration does not specifically limit arrangements of the intercooler bracket and the compressor bracket, the compressor bracket may overlap the connecting portion on the base end sides of the pair of arms of the intercooler bracket, the intercooler bracket may be secured to the compressor bracket at a position where the connecting portion overlaps the compressor bracket.

According to this aspect, the intercooler bracket is secured to the stack frame on the base end sides of the respective arms, and the intercooler bracket is secured to the stack frame at a position where the connecting portion overlaps the compressor bracket. Thus, the mounting state of the intercooler can be more stabilized.

While the above-described configuration does not specifically limit a positional relationship among the intercooler bracket, the stack frame, and the compressor bracket, the intercooler bracket may be secured to the stack frame while the intercooler bracket is sandwiched between the stack frame and the compressor bracket.

According to this aspect, securing the intercooler bracket by sandwiching the intercooler bracket between the stack flame and the compressor bracket can enhance the strength of them. The intercooler bracket restrained in the up-down direction can reduce the vibration on the intercooler bracket in the up-down direction. The securing the intercooler bracket by sandwiching it between the stack frame and the compressor bracket ensures necessary strength, thus reducing resonance at traveling, on a rough road. At a maintenance or a replacement of the compressor, the compressor can be removed without removing the intercooler.

The intercooler bracket may include at least two projecting portions projecting toward the compressor bracket side, and the compressor bracket may include positioning through holes through which the projecting portions are inserted.

With this aspect, when the compressor bracket is secured to the stack frame, the respective projecting portions of the intercooler bracket are inserted through the positioning through holes. Thus, the compressor bracket can be disposed at an appropriate position with respect to the stack frame and the intercooler bracket. In this arrangement, for example, the compressor bracket can be secured to the stack frame with fasteners such as bolts or screws. Thus, it is not necessary to dispose the stack frame and the intercooler bracket corresponding to the positions of those fasteners in the state where the fasteners are inserted through. Accordingly, the damage on the fasteners can be reduced.

With the moving body of the present disclosure, the mounting state of the intercooler can be stably held regardless of vibration acting on the intercooler when traveling or similar situation.

DETAILED DESCRIPTION

The following describes one embodiment of a moving body according to the present disclosure in detail based on the drawings.

Figure 1:
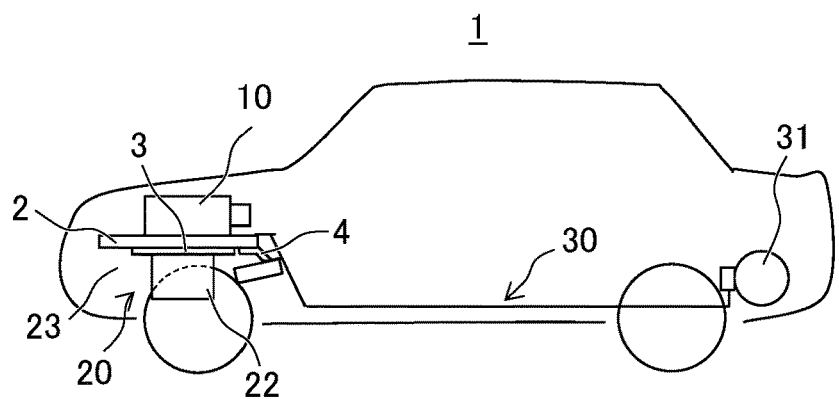
FIG. 1 is a conceptual diagram of a moving body according to the present disclosure.

First, the moving body according to the present disclosure will be described with reference to FIG. 1. In FIG. 1, a moving body 1 is a vehicle such as a passenger car, and has a front part at a front where a fuel cell stack 10, and a compressor 22 and an intercooler 23 as auxiliary machines are mounted. The compressor 22 and the intercooler 23 constitute an oxidant gas supply system 20 that supplies the fuel cell stack 10 with an oxidant gas.

The fuel cell stack 10 is placed on a top of a stack frame 2, the compressor 22 is mounted and secured to a lower portion of the stack frame 2 via a compressor bracket 3 in a suspended state, and the intercooler 23 is secured to the lower portion of the stack frame 2 via an intercooler bracket 4 in a suspended state. The moving body 1 has a rear part where a fuel gas supply source 31 is mounted. The fuel gas supply source 31 constitutes a fuel gas supply system 30 that supplies the fuel cell 10 with a fuel gas.

Figure 2:
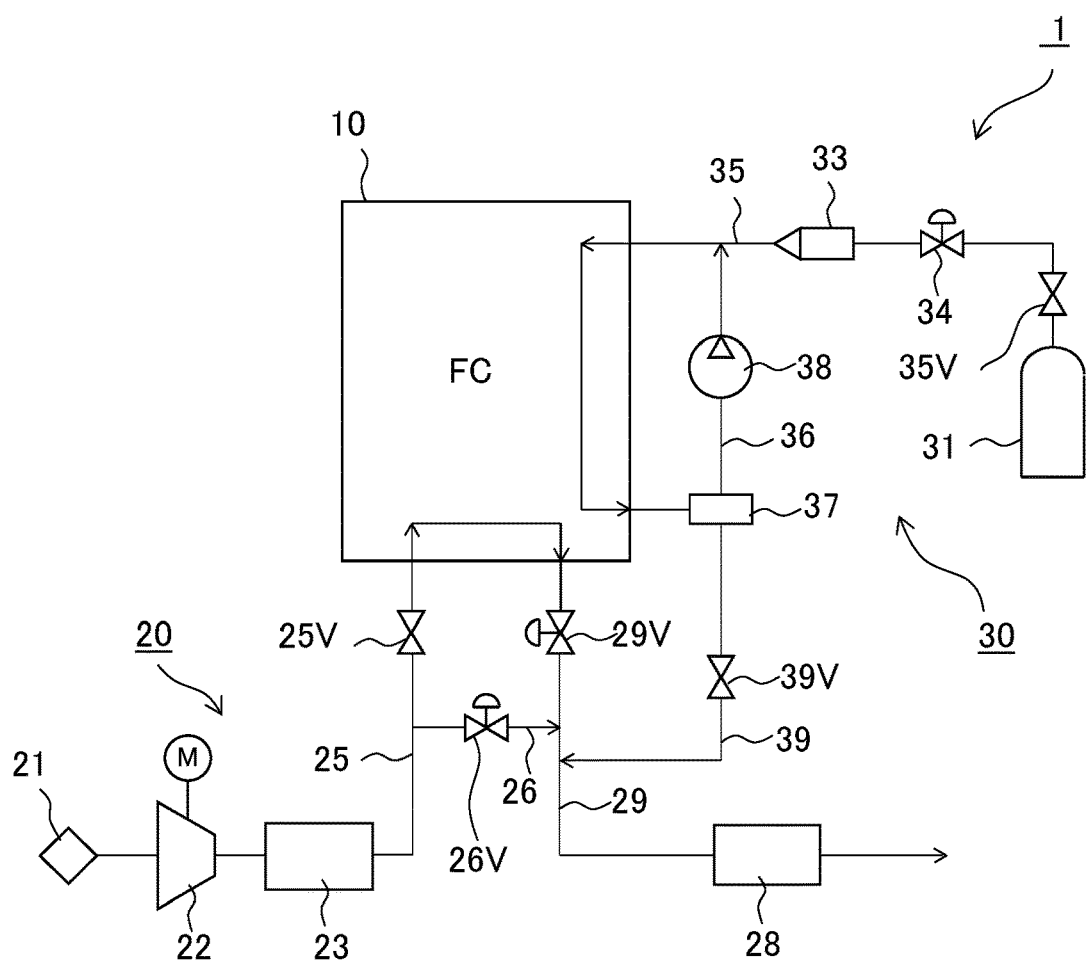
FIG. 2 is a system block diagram of a fuel cell system used in the moving body illustrated in FIG. 1.

Next, the system configuration of the fuel cell system used in the moving body 1 according to the present disclosure will be described with reference to FIG. 2. The fuel cell system illustrated in FIG. 2 includes, for example, a fuel cell (fuel cell stack) 10, the oxidant gas supply system 20, and the fuel gas supply system 30. The fuel cell (fuel cell stack) 10 includes a plurality of stacked cells for fuel cell as unit cells. The oxidant gas supply system 20 supplies the fuel cell 10 with an oxidant gas such as air. The fuel gas supply system 30 supplies the fuel cell 10 with a fuel gas such as hydrogen.

For example, the cell for fuel cell of the solid polymer fuel cell 10 includes a Membrane Electrode Assembly (MEA), which includes an ion permeable electrolyte membrane, an anode side catalyst layer (anode electrode), and a cathode side catalyst layer (cathode electrode). This electrolyte membrane is sandwiched between the anode side catalyst layer and the cathode side catalyst layer. The MEA has both sides on which Gas Diffusion Layers (GDL) are formed to supply the fuel gas or the oxidant gas and collect electricity generated through an, electrochemical reaction. The Membrane Electrode Assembly having both sides on which the (IDLs are disposed is referred to as a Membrane Electrode & Gas Diffusion Layer Assembly (MEGA), and the MEGA is sandwiched by a pair of separators. Here, the MEGA serves as a power generation unit of the fuel cell, and when the gas diffusion layer is not disposed, the MEA serves as the power generation unit of the fuel cell.

The oxidant gas supply system 20 includes, for example, an oxidant gas supply passage 25 and an oxidant gas discharge passage 29. The oxidant gas supply passage 25 supplies (the cathode electrode of) the fuel cell 10 with the oxidant gas. The oxidant gas discharge passage 29 discharges an oxidant off-gas, in which the oxidant gas has been supplied to the fuel cell 10 and has been used for the electrochemical reaction in each of the cells for fuel cell, from the fuel cell 10. Furthermore, a bypass passage 26 is disposed to flow the oxidant gas supplied via the oxidant gas supply passage 25 to the oxidant gas discharge passage 29 without via the fuel cell 10. The flow passages of the oxidant gas supply system 20 can be each formed of a pipe such as a rubber hose and a metallic pipe.

The oxidant gas supply passage 25 includes, for example, an air cleaner 21, the compressor 22, and the intercooler 23 from an upstream side, and the oxidant gas discharge passage 29 includes, for example, a muffler 28. (The air cleaner 21 of) the oxidant gas supply passage 25 includes, for example, an atmospheric pressure sensor and an air flow meter, which are not illustrated.

On the oxidant gas supply passage 25, the air cleaner 21 removes dust in the oxidant gas (air and the like) taken from the atmosphere. The compressor 22 compresses the oxidant gas taken in via the air cleaner 21 and pressure-feeds the compressed oxidant gas to the intercooler 23. The intercooler 23 cools the oxidant gas, which is pressure-fed from the compressor 22 and taken in, through, for example, a heat exchange with a coolant to supply to (the cathode electrode of) the fuel cell 10 when the oxidant gas passes through. The oxidant gas supply passage 25 includes an inlet valve 25V to shut off the flow of the oxidant gas between the intercooler 23 and the fuel cell 10.

The bypass passage 26 has one end coupled to (the intercooler 23 or its downstream side of) the oxidant gas supply passage 25, and the other end coupled to the oxidant gas discharge passage 29. The oxidant gas that has been pressure-fed by the compressor 22 and has been cooled and discharged by the intercooler 23 flows through the bypass passage 26 toward the oxidant gas discharge passage 29 while bypassing the fuel cell 10. This bypass passage 26 includes a bypass valve 26V that shuts off the oxidant gas flowing toward the oxidant gas discharge passage 29 to adjust a flow rate of the oxidant gas flowing through this bypass passage 26.

On the oxidant gas discharge passage 29, the muffler 28 separates the oxidant off-gas (exhaust gas) flowing into the oxidant gas discharge passage 29 into, for example, a gas phase and a liquid phase to discharge outside. The oxidant gas discharge passage 29 includes a pressure regulating valve 29V to regulate a back-pressure of the oxidant gas supplied to the fuel cell 10. The above-described bypass passage 26 is coupled to a downstream side of the pressure regulating valve 29V.

Meanwhile, the fuel gas supply system 30 includes, for example, the fuel gas supply source 31 such as a hydrogen tank, a fuel gas supply passage 35, a circulation passage 36, and a fuel gas discharge passage 39. The fuel gas supply source 31, stores a high pressure fuel gas such as hydrogen. The fuel gas supply passage 35 supplies the fuel gas from the fuel gas supply source 31 to (the anode electrode of) the fuel cell 10. The circulation passage 36 circulates the fuel off-gas (unconsumed fuel gas) discharged from the fuel cell 10 to the fuel gas supply passage 35. The fuel gas discharge passage 39 is branched and coupled to the circulation passage 36 to discharge the fuel off-gas inside the circulation passage 36 to the outside (atmospheric release). The flow passages of the fuel gas supply system 30 can be each formed of a pipe such as a rubber hose and a metallic pipe.

The fuel gas supply passage 35 includes a shut-off valve 35V, a regulator 34, and an injector 33. The shut-off valve 35V opens and closes the fuel gas supply passage 35 to shut off the fuel gas flowing toward the fuel cell 10. The regulator 34 regulates (decompresses) a pressure of the fuel gas flowing through the fuel gas supply passage 35. The injector 33 supplies the fuel gas whose pressure has been regulated toward the fuel cell 10. Opening the shut-off valve 35V causes the high pressure fuel gas stored in the fuel gas supply source 31 to flow into the fuel gas supply passage 35 from the fuel gas supply source 31, and the high pressure fuel gas is supplied to (the anode electrode of) the fuel cell 10 with the pressure regulated (decompressed) by the regulator 34 and the injector 33.

The circulation passage 36 includes a gas-liquid separator 37, a circulation pump (hydrogen pump in other words) 38, and similar unit from an upstream side (fuel cell 10 side). The gas-liquid separator 37 performs gas-liquid separation to store generated water contained in the fuel gas (for example, hydrogen) flowing through the circulation passage 36. The fuel gas discharge passage 39 branches from this gas-liquid separator 37. The circulation pump 38 pressure-feeds the fuel off-gas generated, through the gas-liquid separation by the gas-liquid separator 37 to circulate in the fuel gas supply passage 35.

The fuel gas discharge passage 39 includes a purge valve 39V that opens and closes the fuel gas discharge passage 39 to discharge the generated water separated by the gas-liquid separator 37 and a part of the fuel off-gas discharged from the fuel cell 10, The fuel off-gas is discharged through the opening/closing adjustment by the purge valve 39V of the fuel gas discharge passage 39, mixed with the oxidant off-gas flowing through the oxidant gas discharge passage 29, and released outside into the atmosphere via the muffler 28.

The fuel cell system having the above-described configuration performs the electric generation through the electrochemical reaction between the oxidant gas such as air supplied to (the cathode electrode of) the fuel cell 10 by the oxidant gas supply system 20 and the fuel gas such as hydrogen supplied to (the anode electrode of) the fuel cell 10 by the fuel gas supply system 30.

Next, distinctive configurations of the moving body 1 according to this embodiment will be described in detail with reference to FIGS. 3 to 7. The moving body 1 of this embodiment includes the compressor 22, the intercooler 23, and the fuel cell stack 10. The compressor 22 compresses and discharges the oxidant gas supplied to the fuel cell stack 10. The intercooler 23 cools the oxidant gas discharged from the compressor 22. The fuel cell stack 10 is supplied with the oxidant gas cooled in the intercooler 23.

The moving body 1 includes the stack frame 2, the compressor bracket 3, and the intercooler bracket 4. The fuel cell stack 10 is mounted to the top of the stack frame 2. The compressor bracket 3 is secured to the stack frame 2, and the compressor 22 is mounted to the compressor bracket 3. The intercooler bracket 4 is secured to the stack frame 2, and the intercooler 23 is mounted to the intercooler bracket 4.

The intercooler bracket 4 has a pair of arms 4a, 4a extending from the stack frame 2. The arms 4a each have a distal end side where the intercooler 23 is mounted to the respective arms 4a.

The arms 4a, 4a each have a base end side where a connecting portion 4b is integrally formed with the pair of arms 4a, 4a to connect the pair of arms 4a, 4a. Furthermore, the intercooler bracket 4 is secured to the stack frame 2 on the base end sides of the respective arms 4a. This distinctive configuration will be described in detail below.

Figure 3:
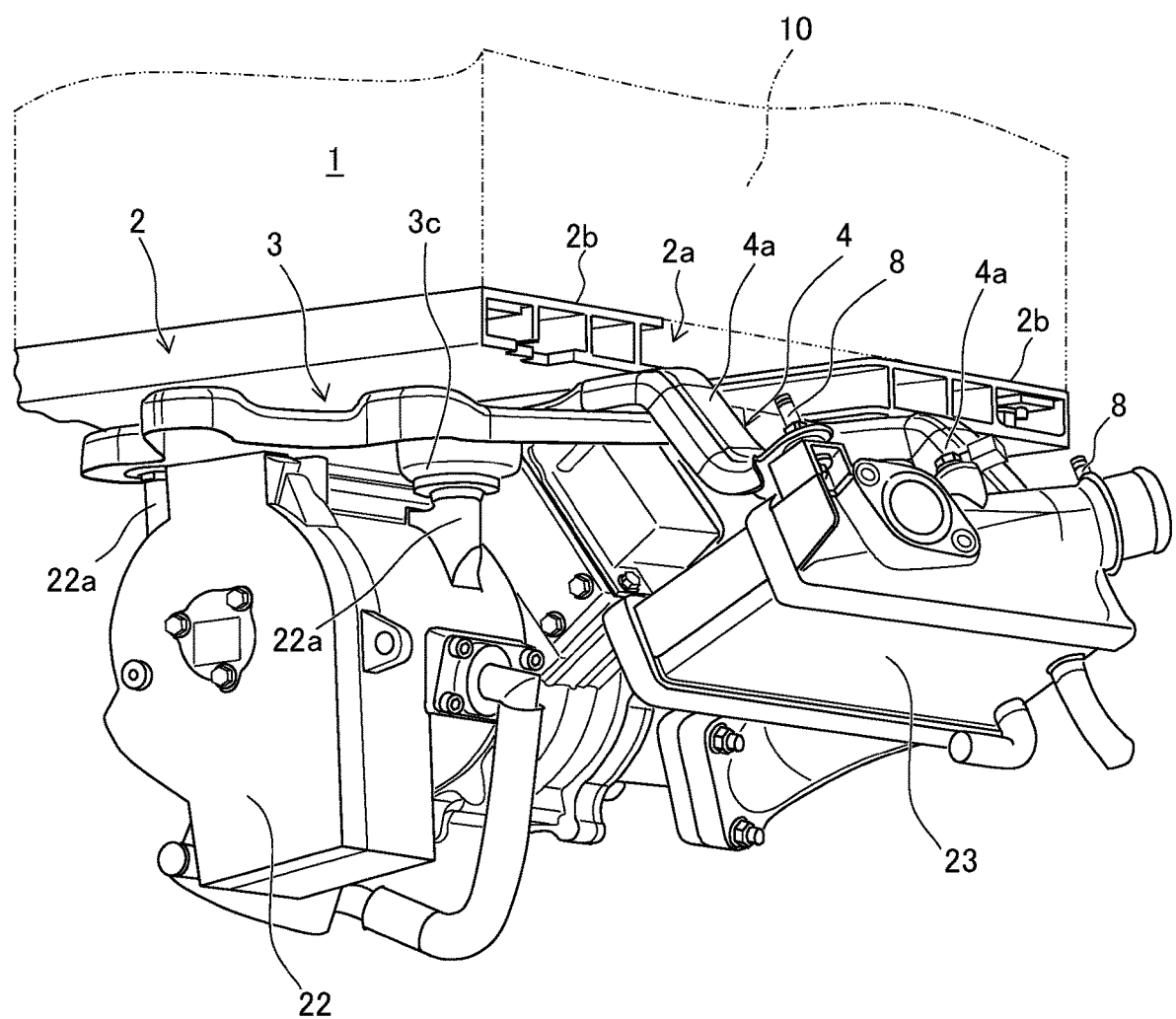
FIG. 3 is a main part perspective view illustrating a main part of the moving body in one embodiment of the present disclosure.

The stack frame 2 is formed of an extruded material made of, for example, aluminum. The stack frame 2 is fastened to a body of the moving body 1 at a front portion (inside a front compartment) of the moving body 1 in a state close to a horizontal state. As illustrated in FIG. 3, the stack frame 2 has a recessed center as a recessed portion 2a, and various kinds of pipes, rubber hoses, and the like are arranged at this recessed portion 2a. The recessed portion 2a has both sides as projecting portions 2b. 2b projecting in a longitudinal direction.

The intercooler bracket 4, to which the intercooler 23 is mounted, is formed of a metal plate material through press forming and mounted to the lower portion of the stack frame 2. As described above, the intercooler bracket 4 includes the pair of arms 4a, 4a and the connecting portion 4b connecting the pair of arms 4a, 4a, which are integrally formed (see FIG. 4 and FIG. 5).

As illustrated in FIG. 3, the pair of arms 4a, 4a extend from the stack frame 2 in cantilever shapes in a mounted state. The pair of arms 4a, 4a are inclined downward and have distal end portions inclined upward.

Figure 4:
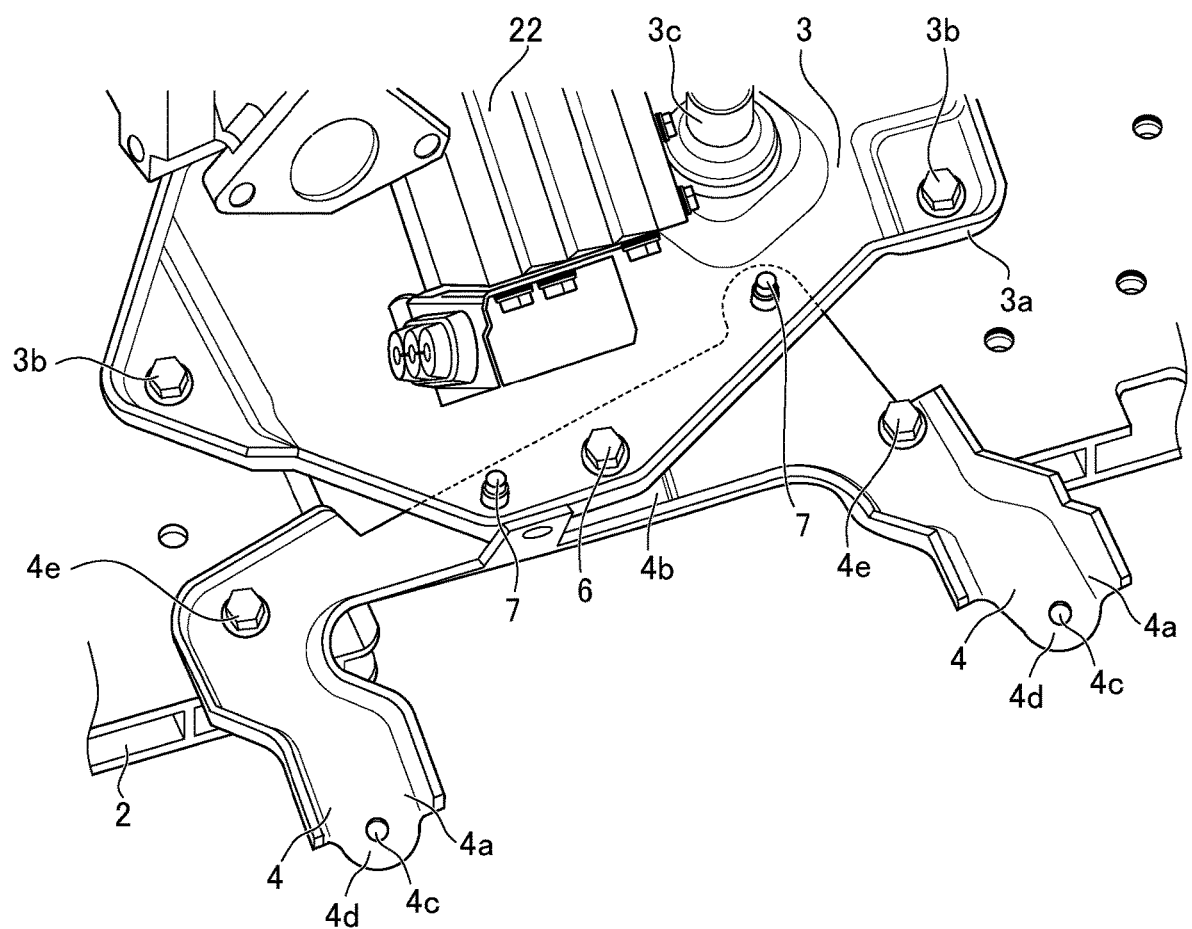
FIG. 4 is a perspective view of the main part illustrated in FIG. 3 when viewed from a lower side in a state where an intercooler is removed.

As illustrated in FIG. 4, the pair of arms 4a, 4a have distal ends with structures for mounting the intercooler 23. Specifically, the respective arms 4a have the distal ends on which mounting portions 4d, 4d are formed, and the mounting portions 4d, 4d have mounting holes 4c, 4c for mounting the intercooler 23.

Additionally, as illustrated in FIG. 4, the intercooler bracket 4 is mounted to the lower portion of the stack frame 2 with two fastening bolts 4e inserted through the intercooler bracket 4. Specifically, the arms 4a each have the base end secured to the projecting portion 2b of the stack frame 2 with the fastening bolt 4e.

The compressor bracket 3, to which the compressor 22 is mounted, is formed of a metal plate material through press forming, and has a rib 3a whose outer peripheral edge projects downward for reinforcement.

Figure 5:
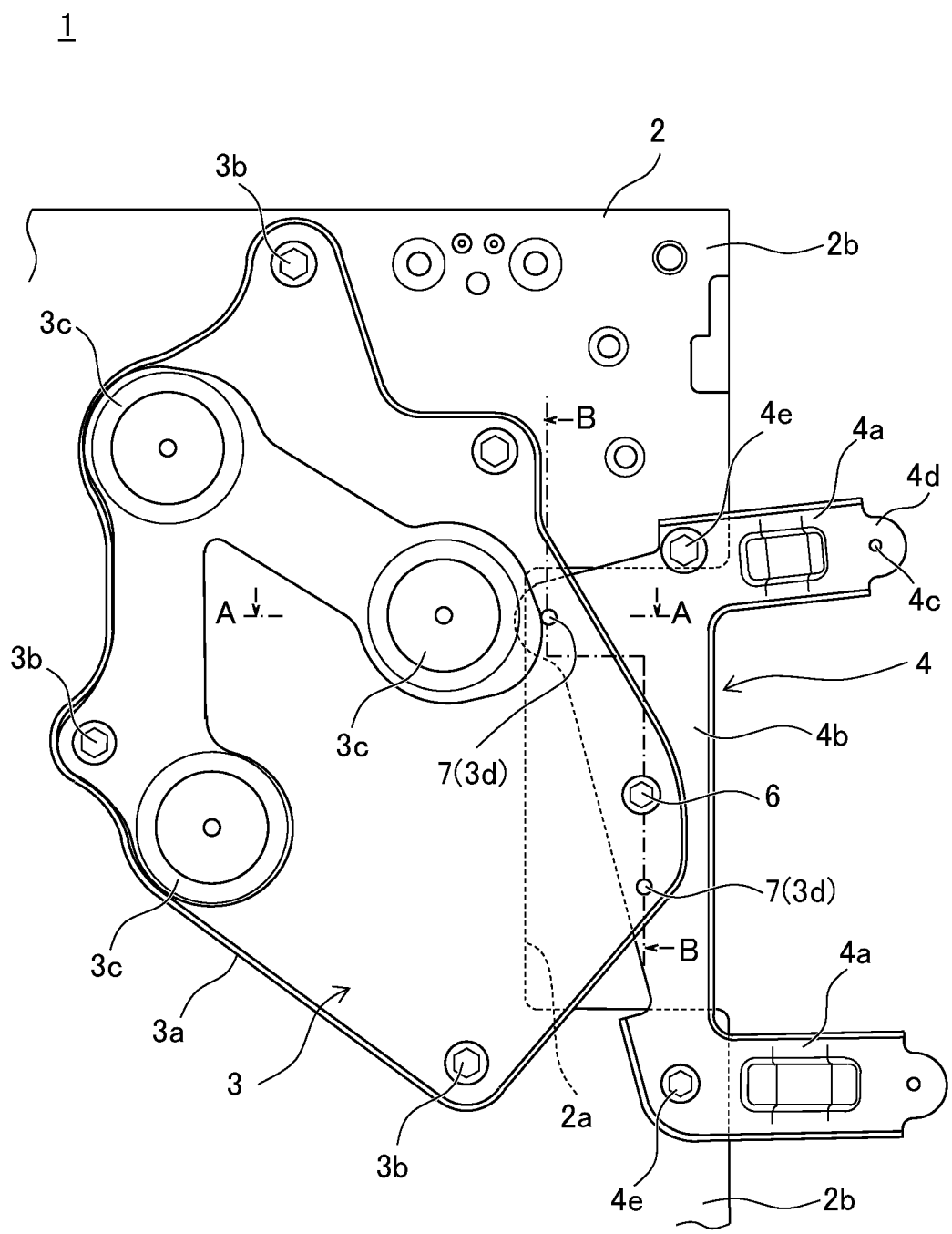
FIG. 5 is a bottom view of the main part illustrated in FIG. 4 in a state where a compressor and the intercooler are removed.

As illustrated in FIG. 5, the compressor bracket 3 is mounted to the lower portion of the stack frame 2 with fastening bolts 3b inserted through the compressor bracket 3 at four positions inside the rib 3a. The compressor bracket 3 has three projecting mount portions 3c for mounting the compressor 22 on an inner flat plate part.

Figure 6:
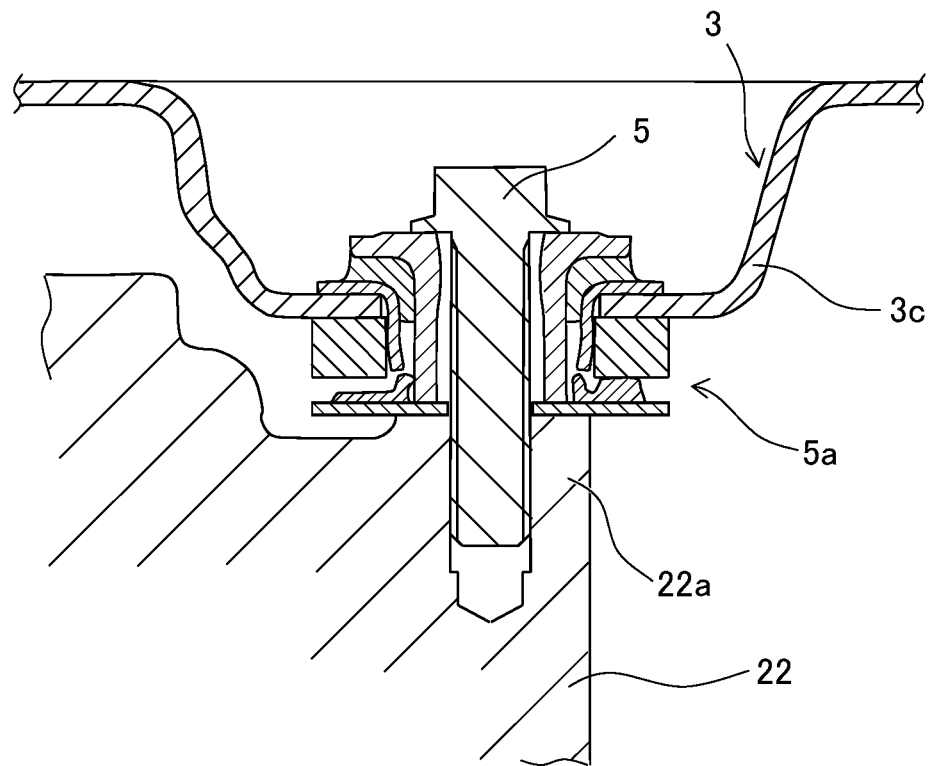
FIG. 6 is a cross-sectional views taken along a line A-A in FIG. 5.

As illustrated in a cross-sectional view in FIG. 6, the three mount portions 3c are formed so as to project downward with a truncated cone shape in cross section. The mount portion 3c has a through hole through which a fastening bolt 5 is inserted via a cushion bearing 5a in which a compressed rubber is interposed, and three fastening bolts 5 are screwed into mounting boss portions 22a of the compressor 22. This ensures a structure where the compressor 22 is mounted to the compressor bracket 3 in a suspended state.

Figure 7:
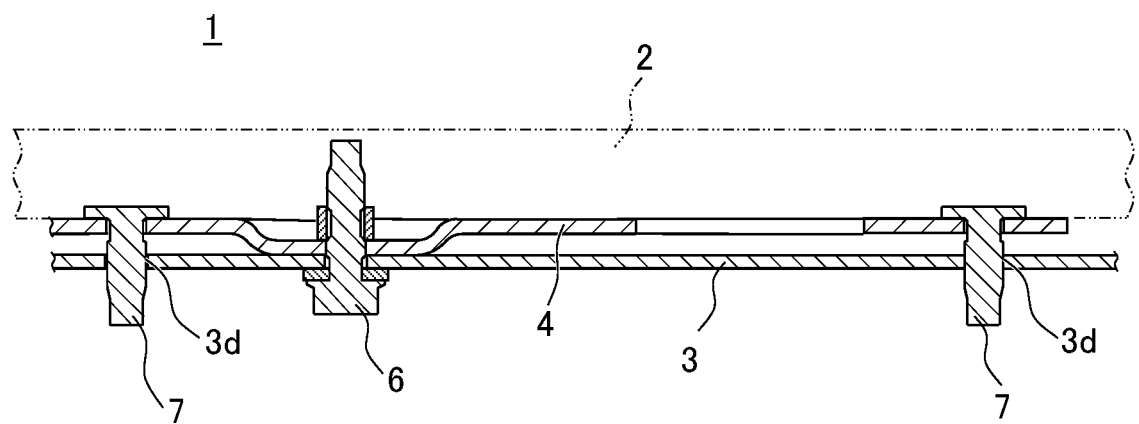
FIG. 7 is a cross-sectional view taken along a line B-B in FIG. 5.

As illustrated in FIG. 5 and FIG. 7, the intercooler bracket 4 includes the connecting portion 4b connecting the pair of arms 4a, 4a, and the compressor bracket 3 overlaps the connecting portion 4b. At a position where the connecting portion 4b overlaps the compressor bracket 3, the intercooler bracket 4 is secured to the compressor bracket 3 with a fastening bolt 6, thus the intercooler bracket 4 is connected to the compressor bracket 3. In view of this, the intercooler bracket 4 is secured to the stack frame 2 in a state of being sandwiched between the stack frame 2 and the compressor bracket 3.

At the overlapping portion of the intercooler bracket 4 and the compressor bracket 3, the intercooler bracket 4 has at least two projecting portions projecting toward the compressor bracket 3 side. As the projecting portions, as illustrated in FIG. 4 and FIG. 7, two bolts 7, 7 project downward and are secured by welding. The compressor bracket 3 has positioning through holes 3d, 3d through which the two bolts 7, 7 are inserted. This configuration provides an accurate positioning and connection of the intercooler bracket 4 and the compressor bracket 3 with the two bolts 7, 7 and the positioning through holes 3d, 3d.

Thus, the intercooler bracket 4 is secured to the lower portion of the stack frame 2, and the compressor bracket 3 is secured to the further lower portion. More specifically, the intercooler bracket 4 is secured in the state of being sandwiched between the stack frame 2 and the compressor bracket 3. Furthermore, below the stack frame 2, the intercooler bracket 4 is connected to the compressor bracket 3 with the fastening bolt 6, and they are secured.

Actions of the moving body of the embodiment configured as described above will be described below. In this embodiment, the moving body 1 includes the stack frame 2 at the front part, and the fuel cell stack 10 is placed on and secured to the top of the stack frame 2.

The stack frame 2 has the lower portion to which the intercooler 23 is secured via the intercooler bracket 4 in the suspended state, Specifically, the intercooler bracket 4 is fastened and secured to the lower portion of the stack frame 2 with the two fastening bolts 4e, 4e, and subsequently, the intercooler 23 is secured to the two arms 4a, 4a of the intercooler bracket 4 with fastening bolts (not illustrated). The intercooler 23 is supported to the intercooler bracket 4 with the integrally formed pair of arms 4a, 4a, thus an accuracy of the assembly position of the intercooler bracket 4 is improved.

Next, the compressor 22 is secured to the mount portions 3e of the compressor bracket 3 with the three fastening bolts 5 while the cushion bearings 5a are interposed. Subsequently, the compressor bracket 3 to which the compressor 22 has been secured is secured to the stack frame 2 with the four fastening bolts 3b.

At this securing, the two positioning through holes 3d, 3d formed at the compressor bracket 3 are positioned so as to match the bolts 7, 7 as the two projecting portions secured to the intercooler bracket 4, and then, the intercooler bracket 4 is secured to the compressor bracket 3 with the fastening bolt 6 for securing.

Thus, when the compressor bracket 3 is seemed to the stack frame 2, the bolts 7, 7 as the projecting portions of the intercooler bracket 4 are inserted through the respective positioning through holes 3d, 3d formed at the compressor bracket 3. Accordingly, the compressor bracket 3 can be disposed at the appropriate position with respect to the stack frame 2 and the intercooler bracket 4.

This ensures accurately attaching/removing the compressor bracket 3 to/from the intercooler bracket 4. The hastening of the compressor bracket 3 to the intercooler bracket 4 is separated from the positioning of the compressor bracket 3 with respect to the intercooler bracket 4. This eliminates the need for the positioning with the fastening bolt or similar component, thus reducing a damage on a thread ridge of the fastening bolt to improve reliability on the fastening.

Thus, the pair of arms 4a, 4a of the intercooler bracket 4 can secure the intercooler bracket 4 to the stack frame 2 on the base end sides of the respective arms 4a in a state of being connected by the connecting portion 4b integrally formed with the pair of arms 4a, 4a. In view of this, each of the arms 4a connected by the connecting portion 4b does not turn even when a moment acts on the distal ends of the arms 4a cantilevering the intercooler 23 in the vibration of the moving body 1. The intercooler bracket 4 with the arms 4a integrated via the connecting portion 4b has a high rigidity in the up-down direction. Consequently, the mounting state of the intercooler 23 can be stably held regardless of vibration acting on the intercooler 23 when traveling or similar situation.

Furthermore, at the position where the connecting portion 4b overlaps the compressor bracket 3, the intercooler bracket 4 is secured to the compressor bracket 3 with the fastening bolt 6. Accordingly, the intercooler bracket 4 is secured to the stack frame 2 and the compressor bracket 3 secured to the stack frame 2 at three points with the two fastening bolts 4e and the one fastening bolt 6. Consequently, the stable securing of the intercooler bracket 4 can be achieved.

Securing the intercooler bracket 4 by sandwiching it between the stack frame 2 and the compressor bracket 3 not only enhances strengths of them but also restrain the intercooler bracket 4 in the up-down direction, thus ensuring the enhanced resistance of the intercooler bracket 4 against the vibration in the up-down direction at traveling of the moving body 1.

At a maintenance or a replacement of the compressor 22, the compressor 22 can be easily removed with the compressor bracket 3 without removing the intercooler 23. Furthermore, the securing the intercooler bracket 4 by sandwiching it between the stack frame 2 and the compressor bracket 3 ensures a necessary strength, thus reducing resonance at traveling on a rough road.

One embodiment of the present disclosure has been described in detail above, the present disclosure is not limited to the above-described embodiment, and can be subjected to various kinds of changes of design without departing from the spirit of the present disclosure described in the claims. For example, while the vehicle has been exemplified as the moving body, the configuration is not limited to this, and the present disclosure is also applicable to, for example, a railway vehicle that uses the fuel cell stack.

While the bolt has been exemplified as the projecting portion formed on the connecting portion 4b of the intercooler bracket 4, the configuration is not limited to this, and, for example, a column-shaped pin or a conical-shaped pin may be used.

What is claimed is:

1. A moving body comprising:
 a compressor that compresses and discharges an oxidant gas supplied to a fuel cell stack;
 intercooler that cools the oxidant gas discharged from the compressor; and
 a fuel cell stack supplied with the oxidant gas cooled in the intercooler,
 wherein the moving body includes a stack frame, a compressor bracket, and an intercooler bracket, the fuel cell stack is mounted to the stack frame, the compressor bracket is secured to the stack frame, the compressor is mounted to the compressor bracket, the intercooler bracket is secured to the stack frame, and the intercooler is mounted to the intercooler bracket,
 wherein the intercooler bracket includes a pair of arms extending from the stack frame,
 wherein the arms each have a distal end side where the intercooler is mounted to each of the arms,
 wherein the arms each have a base end side where the intercooler bracket is secured to the stack frame, and a connecting portion that connects the pair of arms is integrally formed with the pair of arms.

2. The moving body according to claim 1,
wherein the compressor bracket overlaps the connecting portion on the base tad sides of the pair of arms of the intercooler bracket,
wherein the intercooler bracket is secured to the compressor bracket at a position where the connecting portion overlaps the compressor bracket.

3. The moving body according to claim 2,
wherein the intercooler bracket is secured to the stack frame while the intercooler bracket is sandwiched between the stack frame and the compressor bracket.

4. The moving body according to claim 3,
wherein the intercooler bracket includes at least two projecting portions projecting toward the compressor bracket side, and the compressor bracket includes positioning through holes through which the projecting portions are inserted.

* * * * *

UNITED STATES PATENT AND TRADEMARK OFFICE
CERTIFICATE OF CORRECTION

PATENT NO. : 10,714,781 B2
APPLICATION NO. : 16/247047
DATED : July 14, 2020
INVENTOR(S) : Hiroyoshi Matsumoto and Makoto Takeyama It is certified that error appears in the above-identified patent and that said Letters Patent is hereby corrected as shown below:

On the Title Page

Item (72), inventor 1, city, delete "Toyota" and insert --Toyota-shi Aichi--, therefor.

Item (72), inventor 2, city, delete "Toyota" and insert --Toyota-shi Aichi--, therefor.

In the Specification

In Column 1, Line(s) 7, delete "JP 2018-105168" and insert --JP 2018-005168--, therefor.

In Column 1, Line(s) 25, after "cell", delete ",".

In Column 2, Line(s) 32, delete "flame" and insert --frame--, therefor.

In Column 2, Line(s) 38, after "traveling", delete ",".

In Column 3, Line(s) 56, after "an", delete ",".

In Column 3, Line(s) 58, delete "(IDLs" and insert --GDLs--, therefor.

In Column 4, Line(s) 55, after "source 31", delete ",".

In Column 5, Line(s) 29, after "cell 10", delete "," and insert --.--, therefor.

In Column 7, Line(s) 23, after "state", delete "," and insert --.--, therefor.

In Column 7, Line(s) 44, delete "seemed" and insert --secured--, therefor.

In Column 7, Line(s) 52 & 53, delete "hastening" and insert --fastening--, therefor.

Signed and Sealed this
Eighth Day of December, 2020

Andrei Iancu
*Director of the United States Patent and Trademark Office*

In the Claims

In Column 8, Line(s) 49, Claim 1, before "intercooler", insert --an--.

In Column 9, Line(s) 3, Claim 2, delete "tad" and insert --end--, therefor.